3,014,958
PREPARATION OF UNSATURATED ESTERS
Theodore Augur Koch, Glen Mills, Pa., and Ivan Maxwell Robinson, Wilmington, Del., assignors to E. I. du Pont de Nemours and Company, Wilmington, Del., a corporation of Delaware
No Drawing. Filed Jan. 15, 1960, Ser. No. 2,603
5 Claims. (Cl. 260—486)

This invention relates to an improved process for making polymerizable esters of alpha, beta-unsaturated acids by reaction between formaldehyde and esters of the formula $$RCH_2COOR'$$

wherein R is a member of the class consisting of —H, -alkyl, -aryl, aralkyl, -cycloalkyl, -alkenyl, and -alkyl aryl radicals, the number of carbon atoms in R being preferably not in excess of 8, R' being a member of the class consisting of -alkyl, -aryl, -aralkyl, -cycloalkyl, -alkenyl, and alkylaryl radicals, the number of carbon atoms in R' being a'so preferably from 1 to 8.

Heretofore it has been known (British Patent 785,100 and U.S. Patent 2,734,074) that formaldehyde reacts with lower alkyl esters of aliphatic monocarboxylic acids, having at least two hydrogen atoms attached to the alpha carbon, to produce lower alkyl esters of alpha-beta unsaturated acids. This reaction occurred at 250° to 400° C., in the presence of a dehydration catalyst. For best conversions it evidently was necessary to employ a very low mol ratio of anhydrous formaldehyde to ester reactant (this ratio being 0.01:1 to 0.1:1 in U.S. Patent 2,734,074); for example, at these low ratios (ca. 0.05:1) the conversion of formaldehyde to the desired unsaturated ester was as high as 67%. However, this corresponds with only a very low percentage of unsaturated ester in the withdrawn product, especially when a diluent is present. In fact, it has not been known heretofore that any method for carrying out the reaction would give a product containing more than about 5% of the unsaturated ester. Thus the process has been prohibitively expensive and prior to the present improvement was not commercially competitive with other processes already in operation.

An object of the present invention is to provide improvements in the process for making unsaturated esters from formaldehyde and other esters. A further object is to provide an improved process for manufacturing methyl acrylate; still another object is to provide an improved process for manufacturing methyl methacrylate. Other objects of the invention will appear hereinafter.

It has been discovered in accordance with this invention that the aforesaid process for the production of polymerizable alpha, beta-ethylenically unsaturated esters is greatly improved by having present, in the mixture into which formaldehyde is introduced, a substantial concentration of the desired unsaturated ester, generally exceeding about 7% of the weight of reactant ester. In preferred embodiments the mol ratio of reactant ester to product ester at the time of introduction of formaldehyde, is from about 1:1 to about 15:1. The reactant ester: formaldehyde mol ratio immediately after injection of formaldehyde into the unsaturated ester-containing mixture may be as low as from 1.5:1 to 7:1, when water is absent but should be somewhat higher if water is present, e.g. about 7:1 to 20:1.

The process of the invention is preferably performed at a temperature of about 225° to 450° C. The pressures employed are not particularly critical, and pressures of about 1 to 5 atmospheres are quite satisfactory. The reactants should be in the vapor phase under the reaction conditions for most economic operation, but pressures high enough to liquefy the ester reactant may be used if desired.

The reaction is performed in the presence of a dehydration catalyst, suitable dehydration catalysts being potassium dihydrogen phosphate, and other alkali and alkaline earth phosphates (including the pyrophosphates and metal hydrogen phosphates), aluminum phosphate, boron phosphate, calcium sulfate, silica gel, $P_2O_5$, boric oxide on silica gel, titania gel, and oxides, including mixed oxides, of alkali metals, alkaline earth metals, Zn, Cd, Al, Zr, Sn, Pb, Th, V, Cr, Mo, W, Mn, Ta, Fe, Co, Ni, Ru, Rh, Pd, Pt, etc. The catalyst may be present in granular particulate or fluidized bed form and may be used in conjunction with suitable supports.

Diluents such as water, methanol, etc., may be employed if desired, but they are not essential. It is convenient to employ available aqueous formaldehyde mixtures, such as the 60% formaldehyde compositions available from formaldehyde synthesis units. The formaldehyde may be introduced as methylal or in anhydrous forms, such as trioxane, if desired.

The process may be performed in any suitable apparatus, using appropriate materials of construction such as stainless steel, copper, brass, ceramics, silver lined metals, and the like. Conventional methods for temperature control may be used, and this is not particularly troublesome, since the overall heat effect is rather small.

The reaction may be performed by means of a multiple injection technique by means of which formaldehyde is repeatedly injected at a succession of points along a continuous reactor. At each successive injection point the concentration of desired unsaturated ester becomes higher until a large amount of the reactant ester is consumed. Full consumption of the reactant ester is undesirable since the reaction rate drops off as the concentration of reactant ester decreases. In the multiple injection method there is a starving of the formaldehyde concentration while the desired ester builds up to higher and higher concentration levels, until the reaction mixture contains sufficient concentration of desired ester to make take-off feasible.

Another method for practicing the invention is to employ a doughnut type of reactor with circulating reaction mixture having a high content of unsaturated ester product with one or more points of injection of formaldehyde, said reactor having an ester reactant input point, and a take-off point. Still another method is to have the unsaturated ester present initially in high concentration, in a batch or continuous process, and to raise the concentration still further as hereinabove described. Surprisingly, the presence of large amounts of the product ester does not adversely affect the forward reaction as would normally be expected. Therefore, the operation can be performed by use of the product ester as diluent instead of the reactant ester, with corresponding economic advantage. It is usually feasible to raise the content of product ester by, for example, about 4 to 5% at each formaldehyde injection point, when operating in this manner. Dimers, trimers, etc. of the product ester can be returned to the reaction zone if desired.

The invention is illustrated further by means of the following examples. Except as otherwise specified, the apparatus used consisted of a 3 foot length of high silica glass tubing having an internal diameter of 25 mm. This tube was mounted vertically with a 50 cc. section of the tube used as a catalyst area. Approximately an equal volume of the reactor was used as a preheating zone. In general, the feed stock was added slowly to the top of the reactor. An inert gas, $N_2$, was used in some instances to assist in preventing initial oxidation and in sweeping the products away from the catalyst. The reaction gases were condensed and analyzed.

Example 1

A mixture containing 7.8% by weight of methyl methacrylate and about 92.2% by weight of methyl propionate was introduced into a heated tube containing calcium phosphate catalyst in the form of granules of 8–14 mesh, at a temperature of 350–400° C. together with about 5 grams (per 100 grams of mixed esters) of a commerical formaldehyde solution containing 57% by weight of formaldehyde, 40% by weight of water, and about 3% by weight of methanol (also present were traces of formic acid and methyl formate). The resulting mixture contained 11.3% of methyl methacrylate, which could be separated from the total product by distillation.

Example 2

A mixture containing 20% by weight of methyl methacrylate and 80% by weight of methyl propionate was introduced into a heated tube containing 50 cc. $Ca_3(PO_4)_2$ in the form of granules having a particle size of 8–14 mesh. The ester mixture was introduced at the rate of 17 cc. per 5 minutes, keeping the catalyst temperature at 325°. At the same time formaldehyde in the form of trioxane was introduced at the rate of 4 grams per 80 grams of methyl propionate (mol ratio, methyl propionate:formaldehyde, 6.8:1). The resulting product contained 24.8% of methyl methacrylate.

Example 3

In a series of runs the catalyst of Example 1 was replaced by the catalysts listed below and 2 grams of trioxane was fed per 100 grams of mixed esters in place of the formaldehyde solution, reaction conditions being otherwise essentially the same. The results were as follows:

| Catalyst | Formaldehyde Converted to methyl Methacrylate, Percent |
| --- | --- |
| $KH_2PO_4$ on $SiO_2$ | 70–80. |
| $Ca\ SO_4$ | 65–75 (with some degradation of methyl propionate). |
| $Al\ PO_4$ | 46. |
| $Mg_3(PO_4)_2$ | 82. |
| $Ba\ O$ | slightly greater than theoretical, due to production of formaldehyde by degradation of methyl propionate. |
| $K_2O.MgO.Fe_2O_3$ | 84. |

Example 4

Methyl acetate is injected into a reaction tube containing 50 ml. $Ca_3(PO_4)_2$ catalyst, and aqueous 37% formaldehyde is injected at five separate points along the reaction tube, heated at 350° to 400° C. At each injection point formaldehyde sufficient to raise the level to a methyl acetate:formaldehyde mol ratio of 4:1 is injected. The rate of feed of methyl acetate is about one gram per minute. Distillation of the resulting mixture shows that the chief product of the reaction is methyl acrylate.

Example 5

A solution consisting of 95.5 grams methyl propionate, 7.5 grams methyl methacrylate, and 5.0 grams of a mixture of 60% by weight of formaldehyde and 40% by weight of water, was passed over 50 cc. of calcium phosphate (8 to 14 mesh) at the rate of 4 cc. per 10 minutes, at a temperature of 350° C. The inlet stream contained 6.92 weight percent of methyl methacrylate and the outlet stream contained 10.6 weight percent of methyl methacrylate. When the rate was increased to 11 cc. per 10 minutes, temperature being raised to 375°, the outlet stream contained 9.9% methyl methacrylate.

Example 6

A mixture containing 51% (by weight) methyl acetate, 43% methyl acrylate, 4% trioxane, 0.9% of polymeric material derived from methyl acrylate, and 1.1% hydroquinone (as polymerization inhibitor) was passed over 50 cc. calcium phosphate (8 to 14 mesh) at the rate of 4.2 cc. per minute. The effluent contained 48% by weight of methyl acrylate.

It is to be understood that the foregoing examples are illustrative and that the invention is not limited to the illustrations given. The ester reactant, for example, can be varied and in particular may be such widely differing materials as methyl, ethyl, n-propyl, isopropyl, butyl (n, iso, sec., and tert.), hexyl, allyl, butenyl, cyclohexyl butadienyl, hexenyl, hexadienyl, and phenyl esters of such acids as acetic propionic, butyric, caproic, caprylic, vinylacetic, allylacetic, hexendioic, phenylacetic, cyclohexylacetic, cyclohexylpropionic, etc.

The method of separating the product can also be varied, although conventional methods such as distillation are generally effective. Another method which can be used effectively is to absorb the products selectively in a bed of solid absorbent material which has greater affinity for the unsaturated products than for the saturated products of similar boiling point. Selective extraction of the unsaturated product can also be resorted to if desired.

The esters produced by the process of this invention are highly useful as polymer intermediates, as exemplified by the methyl methacrylate. The polymerizability of these esters is a result of the substitution of a terminal methylene group for two hydrogens alpha to the —COOR' group.

We claim:

1. In a process for producing polymerizable esters of alpha, beta-ethylenically unsaturated acids by reaction between formaldehyde and an ester of the formula $RCH_2COOR'$ wherein R is a member of the class consisting of —H, -alkyl, -aryl, -aralkyl, -cycloalkyl, -alkenyl, and -alkylaryl radicals, R' being a member of the class consisting of -alkyl, -aryl, -aralkyl, -cycloalkyl, -alkenyl, and -alkylaryl radicals at 225° to 450° C. in the presence of a dehydration catalyst, the improvement which comprises introducing formaldehyde into a mixture containing the said reactant ester and at least 7% by weight of the said polymerizable ester, the mol proportion of the reactant ester to formaldehyde being from 1.5:1 to 20:1, said ratio being further limited in that it exceeds 7:1 when water is present.

2. Process of claim 1 wherein the reactant ester is an ester of propionic acid.

3. Process of claim 1 wherein the reactant ester is methyl propionate and the polymerizable ester is methyl methacrylate.

4. Process of claim 1 wherein the reactant ester is an ester of acetic acid.

5. Process of claim 1 wherein the formaldehyde reactant is introduced simultaneously at a multiplicity of injection points in a continuous reactor.

UNITED STATES PATENTS

References Cited in the file of this patent

| 2,734,074 | Redmon | Feb. 7, 1956 |
| 2,821,543 | Etherington | Jan. 28, 1958 |